United States Patent [19]

Delavaux

[11] Patent Number: 5,878,065
[45] Date of Patent: Mar. 2, 1999

[54] FABRY-PEROT PULSED LASER HAVING A SWITCHABLE LOOP REFLECTOR

[75] Inventor: Jean-Marc Pierre Delavaux, Wescosville, Pa.

[73] Assignee: Lucent Technologies Inc., Murray Hill, N.J.

[21] Appl. No.: 850,877

[22] Filed: May 2, 1997

[51] Int. Cl.$^6$ .................................................. H01S 3/098
[52] U.S. Cl. .................................. 372/18; 372/6; 372/94
[58] Field of Search ................................. 372/18, 6, 25, 372/92, 94

[56] References Cited

U.S. PATENT DOCUMENTS

| 5,381,426 | 1/1995 | Fontana et al. | 372/18 |
|---|---|---|---|
| 5,450,427 | 9/1995 | Fermann et al. | 372/18 |
| 5,577,057 | 11/1996 | Frisken | 372/18 |
| 5,588,013 | 12/1996 | Reitz et al. | 372/94 |
| 5,590,142 | 12/1996 | Shan | 372/18 |
| 5,608,570 | 3/1997 | Brandle et al. | 359/321 |
| 5,617,434 | 4/1997 | Tamura et al. | 372/6 |

OTHER PUBLICATIONS

Duling, I.N. et al., "Single–Polarisation Fibre . . . ", *Electronics Letters,* vol. 28, No. 12, pp. 1126–1128 (Jun. 4, 1992).
Carruthers, T.F. et al., "10–GHz, 1.3–ps erbium . . . ", Optics Letters, vol. 21, No. 23, pp. 1927–1929 (Dec. 1, 1996).
Lin, H., et al., "Adjustment–free femtosecond . . . ", *OFC Technical Digest,* WL5, pp. 165–166 (1997), No Month.
Jeon, M. et al., "Harmonically mode–locked . . . ", *OFC Technical Digest,* WL6a, pp. 166–167 (1997), No Month.

*Primary Examiner*—James W. Davie

[57] ABSTRACT

In a pulsed Fabry-Perot laser, such as a Q-switched laser or a mode-locked laser, one of the resonator reflectors comprises a waveguide loop coupled to the gain medium via a polarization splitter/combiner. In one embodiment, only a switchable isolator is located in the loop, thereby significantly reducing insertion loss.

9 Claims, 3 Drawing Sheets

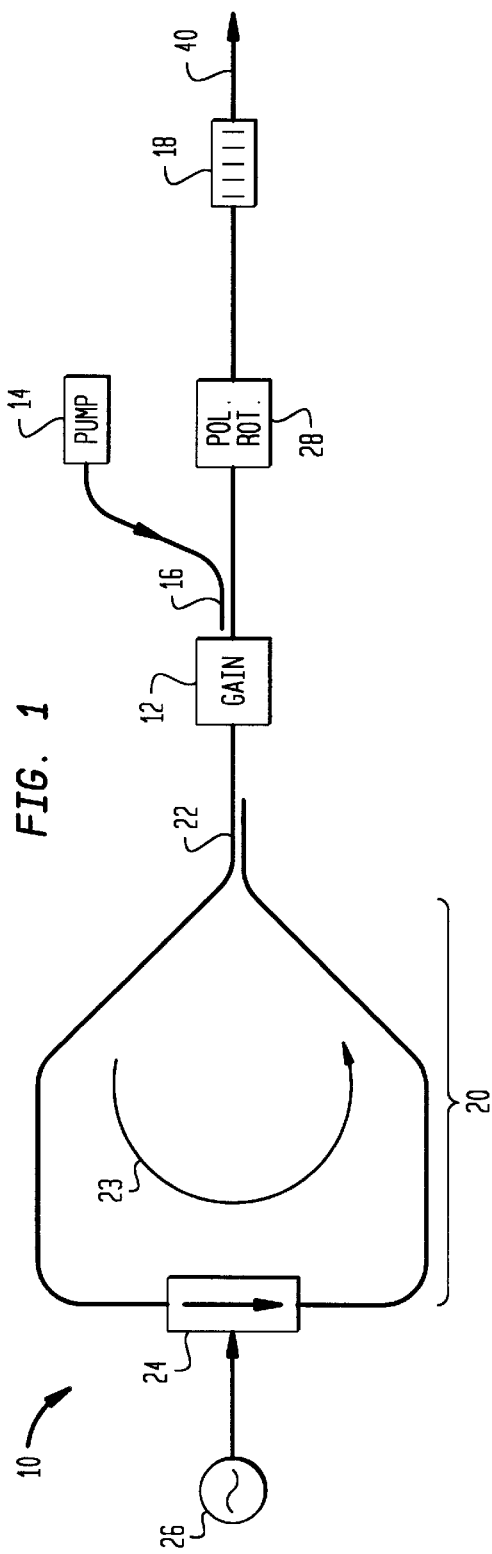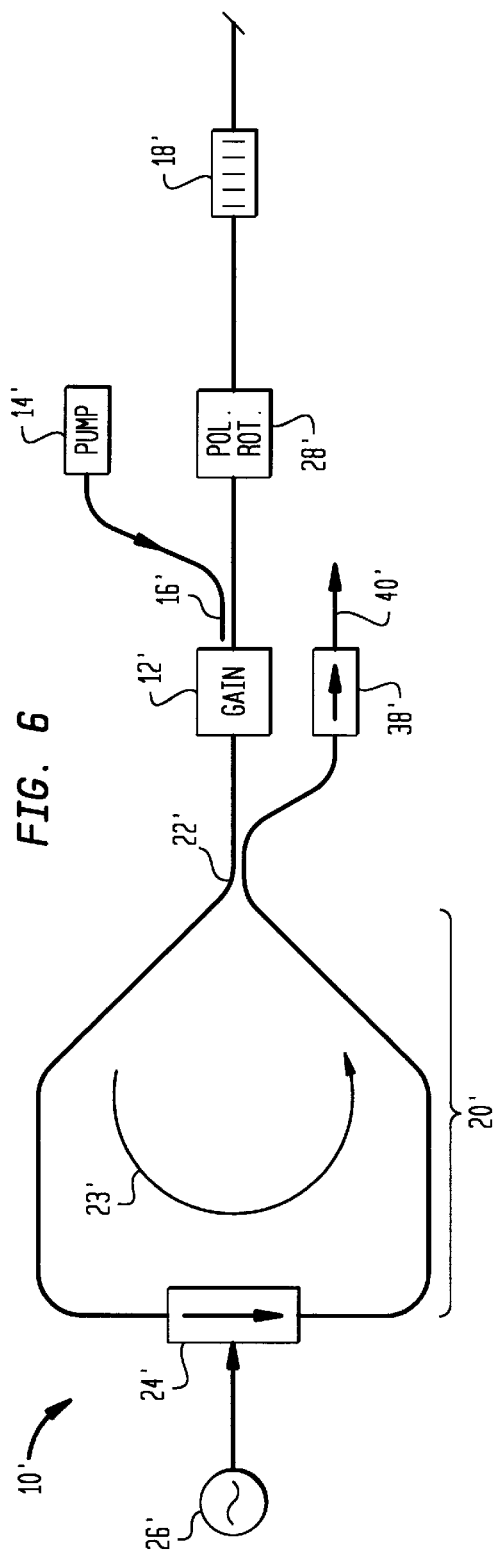

FABRY-PEROT PULSED LASER HAVING A SWITCHABLE LOOP REFLECTOR

FIELD OF THE INVENTION

This invention relates generally to pulsed lasers and, more particularly, to Q-switched lasers and mode-locked lasers.

BACKGROUND OF THE INVENTION

Pulsed lasers are used in wide variety of applications ranging from signal sources in telecommunications systems to optical sources in sensing and measuring equipment. Q-switched lasers, for example, provide high power, short duration pulses for optical sensing functions, optical time domain reflectometry, and the measurement of nonlinearities in optical fibers. Illustratively, Q-switched lasers are capable of generating peak pulse powers of the order of a few hundred watts or more at repetition rates in the tens of kilohertz range. Pulse durations of a about 1–100 nanoseconds are typical. Mode-locked lasers, on the other hand, may serve as high speed (e.g., multi-gigabit) signal sources in telecommunication systems, particularly soliton transmission systems. As such, the mode-locked laser may generate peak pulse powers of a few hundred milliwatts at repetition rates in excess of 10 GHz. Pulse durations of a few picoseconds are typical.

Q-switched and mode-locked lasers have been extensively reported in the scientific literature. Two basic structures have been successfully demonstrated: a fiber laser ring topology of the type described by F. Fontana et al. in U.S. Pat. No. 5,381,426 issued on Jan. 10, 1995 and a Fabry-Perot (FP) fiber laser configuration of the type shown in U.S. Pat. No. 5,450,427 granted to M. E. Fermann et al. on Sep. 12, 1995. Both of these structures suffer from a similar malady; that is, relatively high insertion losses and hence relatively high lasing thresholds. More specifically, in the ring topology, the single pass gain through the active medium has to exceed the optical insertion loss of the other intracavity components (i.e., the modulator, filter, isolator, etc.) in order to produce lasing. Similarly, in the case of the FP configuration the double pass gain of the active medium has to offset the double pass insertion loss produced by the same type of intracavity components.

One approach to alleviating this problem is to arrange for the laser radiation to make a double pass through its active medium for every single pass through the other intracavity components, thereby reducing the insertion loss introduced by those components. Such a design produces better performance in terms of lower lasing threshold and higher pump conversion efficiency. These indicia translate into higher power, shorter duration, and more stable pulses in both Q-switched and mode-locked lasers. See, for example, the mode-locked Er-fiber laser described by T. F. Carruthers et al. in *Optic Letters,* Vol. 21, No. 23, pp. 1927–1929, Dec. 1, 1996. In the Carruthers laser one mirror or reflector of the FP design is formed by a conventional Faraday rotator, but the other mirror or reflector comprises a polarization-maintaining fiber loop which is coupled to the active medium by a polarization splitter-combiner (PSC). A polarization dependent modulator is located in the loop along with a polarization-rotating splice, an isolator, and an output coupler. However, this design suffers from several disadvantages. First, a modulator is used to generate mode-locking, yet such modulators are the most lossy (e.g., 3–5 dB) and often costly elements in the laser. Second, the behavior of the modulator and the pulse quality (i.e., the shape and/or timing) may be adversely affected by the presence of the multiplicity of other components (i.e., the isolator, coupler, polarization-rotating splice) in the loop. Third, the presence of these additional elements in the loop increases the complexity of the design as well as the number of splices, and hence the total insertion loss.

Thus, a need remains in the art for simpler FP laser design that reduces insertion loss without the disadvantages attendant prior art FP designs.

SUMMARY OF THE INVENTION

These and other problems are addressed in a Fabry-Perot (FP) pulsed laser designed in accordance with my invention. The FP laser comprises a gain medium positioned between a pair of reflectors or mirrors which form a FP cavity or resonator, and at least one of the reflectors comprises a waveguide loop coupled to the gain medium, characterized in that a switchable, unidirectional optical device is located in the loop in order to effect Q-switching or mode-locking

BRIEF DESCRIPTION OF THE DRAWINGS

My invention, together with its various features and advantages, can be readily understood from the following more detailed description taken in conjunction with the accompanying drawing, in which:

FIG. 1 is a schematic block diagram of a FP pulsed laser in accordance with one embodiment of my invention in which the switchable, unidirectional optical device 24 comprises a switchable optical isolator;

FIG. 6 is a schematic block diagram of a FP pulsed laser in accordance with an alternative embodiment of my invention in which the laser output is coupled from a four-port polarization splitter-combiner (PSC).

DETAILED DESCRIPTION OF THE INVENTION

Figure 2:
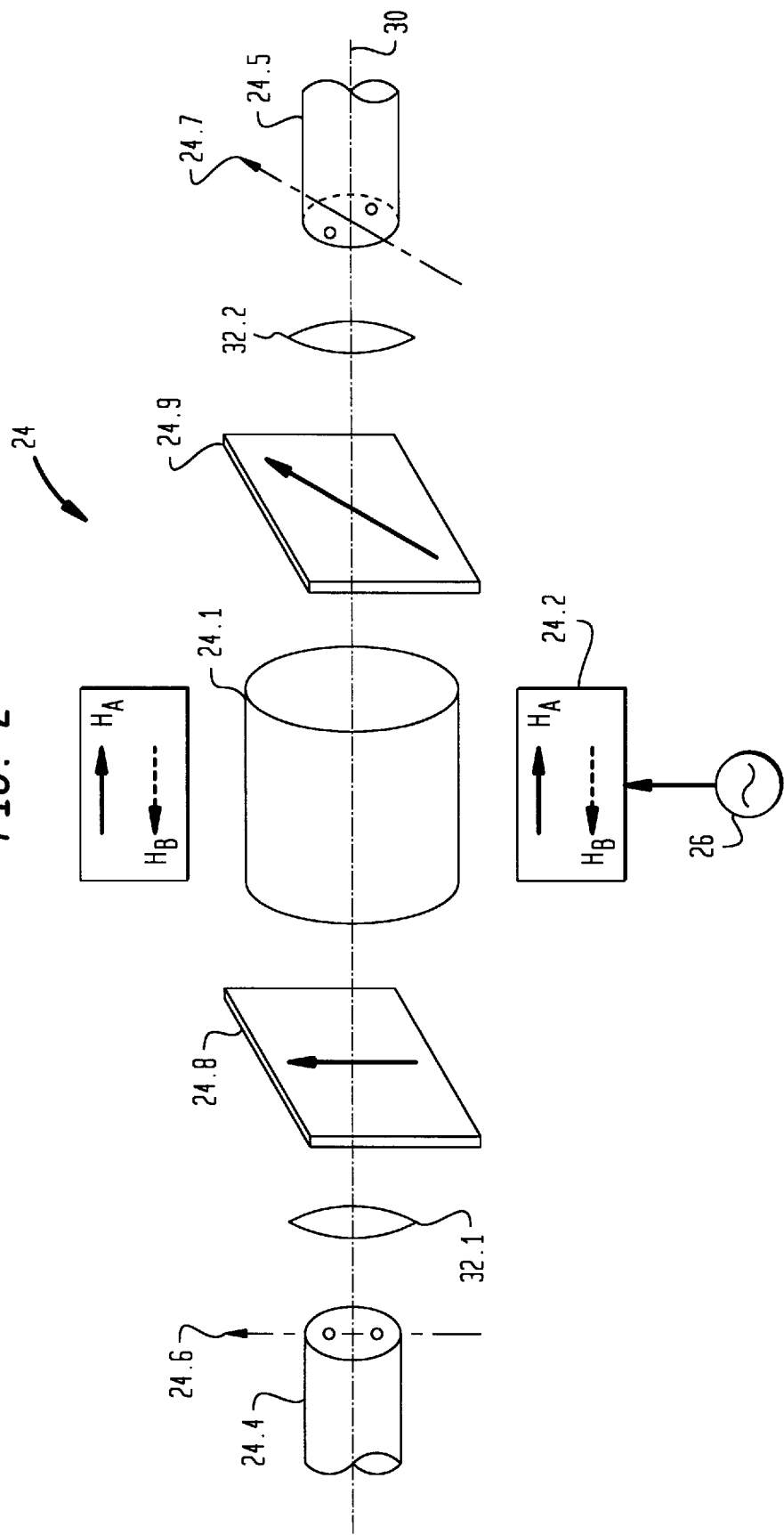
FIG. 2 is a schematic diagram of a switchable optical isolator designed to function as the switchable, unidirectional optical device 24 of FIG. 1.

With reference now to FIG. 1, a Fabry-Perot (FP) pulsed laser 10 comprises a gain medium 12 positioned on an optical axis between a pair of mirrors or reflectors 18 and 20. The laser 10 may operate, for example, as either a Q-switched or mode-locked laser. A source 14 of pump energy is coupled to the gain medium via a coupler or multiplexer 16. The pump source supplies electromagnetic energy at a wavelength and intensity sufficient for the medium 12 to provide optical gain. The interconnections between components, depicted as solid black lines, are typically optical waveguides; for example, optical fibers or substrate-supported integrated waveguides. Indeed, the gain medium itself may be a suitably doped optical fiber or a solid state planar waveguide. As depicted in FIG. 1, the output 40 of the laser is taken through the reflector 18, which, therefore, is made to be partially transmissive. The output signal is coupled to a utilization device (not shown). However, the output signal can be taken from other locations in the laser structure, a topic that will be discussed hereinafter in conjunction with FIG. 6.

In accordance with the embodiment of my invention shown in FIG. 1, the reflector 20 comprises a waveguide loop coupled to the gain medium 12 via a polarization splitter-combiner (PSC) 22. As depicted, the PSC 22 is a multi-port device having one port coupled to the medium 12 and two other ports coupled to the loop. The loop includes a switchable, unidirectional optical device 24 driven by a signal from a control source 26. In one state, device 24 permits the propagation of light/radiation in the loop (e.g., counterclockwise (CCW) as shown by the circular arrow 23). In this state the laser is permitted to lase. But, in a second state, device 24 inhibits propagation in the loop and hence optical feedback to the gain medium, thus preventing lasing. The signal from control source 26 switches device 24 between these two states at a rate suitable for Q-switching or mode-locking the laser.

Illustratively, the switchable, unidirectional device 24 comprises a switchable, polarization-dependent optical isolator. One design of such an isolator is shown in FIG. 2. The design includes a plurality of components positioned along an optic axis 30; namely, an essentially 45° polarization rotator 24.1 (e.g., a well-known Faraday rotator) disposed between a pair of polarizers 24.8 and 24.9. The latter are coupled to polarization-maintaining fiber (PMF), or other polarization-maintaining optical waveguide, segments 24.4 and 24.5 via well-known lens arrangements 32.1 and 32.2 (e.g., well-known GRIN rod lenses), respectively. The remaining fiber making up the laser may be either PMF or polarizing fiber. A magnet 24.2 generates a magnetic field $H_A$ or $H_B$ in the rotator 24.1, and a signal source 26 is coupled to magnet 24.2 for switching the magnetic field between $H_A$ and $H_B$. In one embodiment $H_B$ may be zero; in another $H_B=-H_A$. A principal (e.g., fast or extraordinary) axis 24.6 of first PMF segment 24.4 and a principal (e.g., slow or ordinary) axis 24.7 of the second PMF segment 24.5 are oriented at about 45° to one another; likewise, the polarization directions of the polarizers are oriented at 45° to one another, with the polarization direction of polarizer 24.8 being parallel to axis 24.6 and the corresponding direction of polarizer 24.9 being parallel to axis 24.7.

Figure 4:
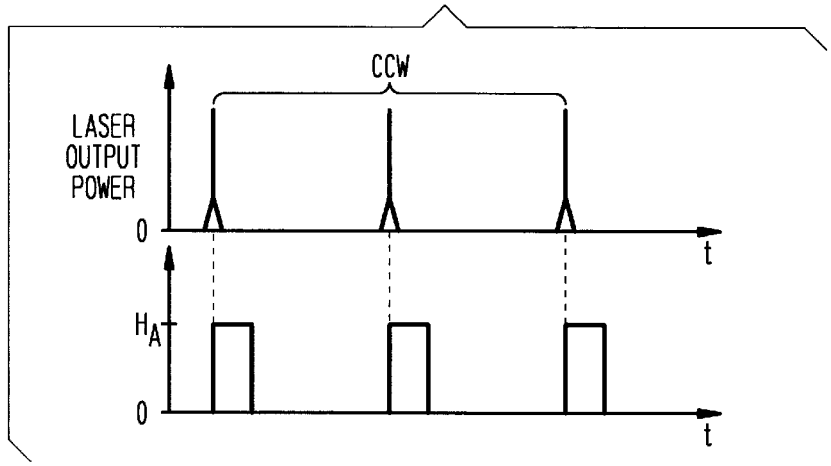
FIGS. 4 & 5 each show a pair of graphs of laser output power (upper graph) and corresponding isolator magnetic field (lower graph)
Figure 5:
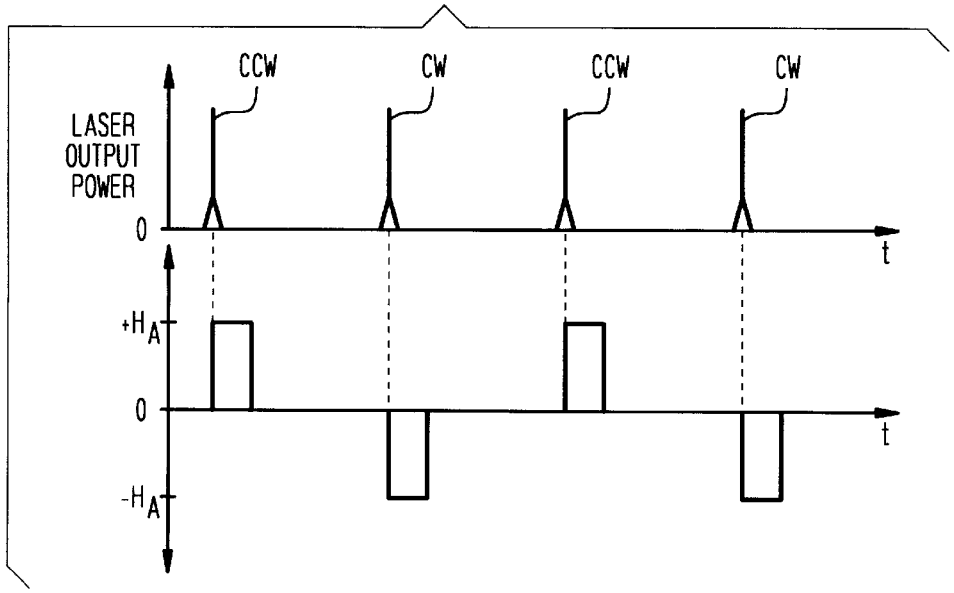

Operation of my invention will be described by reference first to FIG. 3, a graph of the transmission loss of the switchable isolator 24 vs. saturating magnetic field H. The graph shows that the loss $L_2$ is high (e.g., 25–30 dB) at H=0, but the loss $L_1$ relatively low (e.g., 0.5–1.0 dB) at H=±$H_A$. In one embodiment shown in FIG. 4, H is repetitively switched between $H_A$ and zero causing the laser to emit pulses of light each time the field is increased from zero to $H_A$. In this case, the laser pulses propagate in the loop in one direction; e.g., in the CCW direction shown by arrow 23 of FIG. 1. Alternatively, as shown in FIG. 5, H is switched between H=+$H_A$ and H=−$H_A$, once again causing the laser to emit a pulse each time the magnetic field transitions from zero. As before, the transitions from zero to +$H_A$ result in CCW pulse propagation, but the opposite transitions from zero to −$H_A$ result in clockwise (CW) pulse propagation.

To understand how the switchable isolator 24 functions to bring about this type of operation, consider again the laser design of FIG. 1 in which the magnetic field of isolator 24 is switched between +$H_A$ and zero. Pump source 14 delivers sufficient optical power to gain medium 12 to cause it to generate, say, vertically polarized laser light. This light is coupled through PSC 22 into loop reflector 20 where it propagates CCW, enters first PMF segment 24.4 and passes through polarizer 24.8. At this point, the polarization of the light is aligned with the fast axis 24.6 of first PMF segment 24.4. When signal source 26 generates magnetic field +$H_A$, the rotator 24.1 rotates the polarization of the laser light by essentially 45° so that it passes through polarizer 24.9 and enters second PMF segment 24.5 aligned with the slow axis 24.7. At this point the propagating light exiting second PMF segment 24.5 is horizontally polarized. Thus, the light is able to propagate through second PMF segment 24.5, through PSC 22, and back into the gain medium 22. After being amplified, the horizontally polarized light enters an essentially 45° polarization rotator 28 (or an equivalent phase modulator). A portion of the output of rotator 28 passes through partially transmissive grating reflector 18 to provide a laser output 40. Another portion is reflected by reflector 18 and re-enters rotator 28 where its polarization undergoes another essentially 45° rotation. The total rotation of 90° in two directions through rotator 28 means that the light re-entering gain medium 12 from rotator 28 is vertically polarized and hence aligned with the original polarized light generated by the medium 12.

In contrast, light propagating in the opposite direction (e.g., reflected light) when H=+$H_A$ becomes polarized at essentially 45° after passing through polarizer 24.9. Then its polarization is rotated by essentially 45° by rotator 24.1 so that it is blocked by polarizer 24.8. Thus, propagation in the reflector loop is unidirectional; i.e., CCW in this case.

Figure 3:
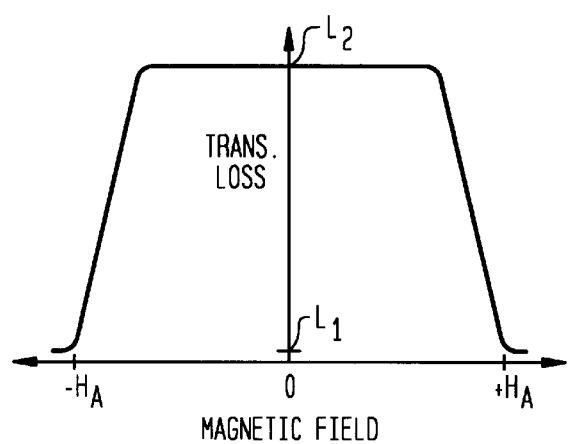
FIG. 3 is a graph of transmission loss vs. saturating magnetic field for the isolator of FIG. 1.

On the other hand, when signal source 26 is turned off (H=0), the rotator 24.1 strongly attenuates light emerging from first PMF segment 24.4; e.g., as shown in FIG. 3, at H=0 the isolator loss $L_2$ may be 25–30 dB. As a result, the intracavity loss of the, laser is increased sufficiently that lasing ceases.

By alternating the magnetic field between +$H_A$ and zero under control of signal source 26, the laser is effectively turned on and off; i.e., its output is pulsed. Likewise, the magnetic field could be switched between −$H_A$ and zero to generate a pulsed output, the only difference being that the pulses in the loop would propagate CW rather than CCW. Moreover, as shown in FIG. 5, the field can be switched between −$H_A$, zero and +$H_A$ to generate pulses which alternatively propagate CCW and CW in the loop. Note, the device 24 is still properly designated as unidirectional because at any given time light propagates through it in only one direction, and light in the opposite direction is significantly attenuated or blocked.

The magnetic field can be created by continuous current levels in designs employing conventional Faraday rotator material, or by current pulses in designs utilizing latchable Faraday material; e.g., a bismuth-doped rare earth iron garnet of the type described by C. D. Brandle et al. in U.S. Pat. No. 5,608,570 issued on Mar. 4, 1997 and incorporated herein by reference.

In these embodiments of my invention, each quantum of laser light or radiation traverses the components making up the reflector 20 (e.g., the unidirectional device 24) only once for every two passes through the gain medium. Consequently, the insertion loss of the laser 10 is reduced relative to that of conventional, pulsed FP laser designs. The insertion loss is reduced even further relative to the Carruthers et al. design because the switchable isolator of FIG. 2 typically has an insertion loss of only 0.5–1.0 dB, whereas the Carruthers et al. modulator typically has an insertion loss of 3–5 dB. And, of course, when the other components in the Carruthers et al. loop reflector are considered, the total insertion loss of the Carruthers et al. design would be that much greater.

These embodiments of my invention have several additional features which render them attractive from a performance and simplicity standpoint. First, the reflector loop 20 is virtually the ultimate in simplicity—it requires only a switchable, unidirectional optical device 24. Second, only two splices are required (one on each side of device 24), thus further reducing insertion loss.

In the embodiment of FIG. 2 switching time may be limited by the speed at which the magnetic field can be reversed, making this design more appropriate for, although not necessarily limited to, Q-switching applications.

Implementation of my invention is possible utilizing many commercially available components which can be assembled to make a hybrid structure that incorporates both optical fiber components as well as other solid state components. However, the invention can also be constructed as an optical hybrid integrated circuit. Illustrative components include the following: (1) the gain medium 12 may be an optical fiber or a glass waveguide doped with Er or co-doped with Er and Yb to provide gain at infrared wavelengths well known in the art; (2) the switchable, unidirectional optical device 24 may be a switchable optical isolator which is described above with reference to FIG. 3; (3) the reflector 18, which is well known in the art, may be a fiber grating of either the linear or chirped variety, although the latter may be advantageous in that it provides for pulse compression and higher peak pulse power; (4) the pump source 14 may be a semiconductor laser or a laser array which generates pump light at 980 nm or may be a double clad fiber laser which generates pump light at 1060 nm, the choice depending on the gain medium utilized; semiconductor lasers of this type are available from Furakawa, Tokyo, Japan or from Lucent Technoligies Inc., Breinigsville, Pa.; (5) the coupler/multiplexer 16 is commercially available from Gould, Millersville, Md.; and (6) the PSC 22 is commercially available from JDS-Fitel, Nepean, Ontario, Canada, from FDK, Waltham, Mass., or from Photonetics, Wakefield, Mass.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, although not explicitly shown, it will be readily apparent to those skilled in the art how to implement my invention and its various embodiments in a hybrid integrated form. In addition, it will be noted that the switchable isolator of FIG. 2 is implemented using polarization-maintaining fiber or waveguide segments which support two orthogonal polarizations (and hence the isolator utilizes polarizers to provide selectivity). However, it could also be fabricated from polarizing fiber which supports only one polarization, thus eliminating the need for the polarizers 24.8 and 24.9. In such a design, the segments 24.4 and 24.5 would comprise polarizing fiber having their polarization directions oriented at essentially 45° to one another.

Also, as mentioned previously, the output 40 of my FP pulsed laser can be taken from locations in the structure other than the partially transmissive grating reflector 18 of FIG. 1. Thus, as shown in FIG. 6, the output 40' is instead taken from the fourth port of a four-port PSC 22' through an isolator 38'. More specifically, the reflector 18' is made to be essentially 100% reflective to the laser light, and the switchable isolator 24' is designed so that the polarization of light emerging from it is launched into the second PMF segment at an angle of essentially 45° with respect to one of its principal axes. Under these circumstances, essentially half of the light is coupled back into the gain medium 12' and half is coupled to the output 40'. The ratio of these two couplings can be adjusted by changing the launch angle; i.e., angles >45° couple more light into the gain medium and less into the output; and, conversely, angles <45° couple more light into the output and less into the gain medium.

Finally, the isolator 24 can be constructed of multiple, tandem optical isolator sections. For example a tandem pair of optical isolators (electrically isolated from one another) can be operated so that one isolator is fixed in a conventional isolator mode (i.e., so that it has low loss for light propagating in one direction and high loss for light in the opposite direction), whereas the other isolator is switched between two states (i.e., between a high loss state ($H=+H_A$) and a low loss state ($H=-H_A$), or between a high loss state ($H=+H_A$) and an intermediate loss state ($H=0$)). A laser pulse is generated at each transition between states.

What is claimed is:

1. A pulsed Fabry-Perot laser comprising first and second reflectors forming a resonator, a gain medium disposed in said resonator, a source of pump energy coupled to said gain medium to cause said medium to generate lasing radiation, said first reflector comprising a waveguide loop, an optical device disposed in said loop to cause said radiation to be generated in the form of pulses, and a coupler for coupling said loop to said gain medium, characterized in that:

said device comprises a switchable unidirectional optical device.

2. The invention of claim 1 wherein said device comprises a switchable optical isolator.

3. The invention of claim 2 further including a magnetic field controller for switching said device between one state in which lasing radiation propagates in said loop and another state in which lasing radiation is blocked in said loop.

4. The invention of claim 3 wherein said isolator comprises first and second spaced apart segments of polarization maintaining optical waveguide, principal axes of said segments being oriented at essentially 45° to one another, first and second polarizers having their polarization directions oriented at essentially 45° to one another and each being parallel to a principal axis of one of said segments, and a first polarization rotator disposed between said polarizers, said controller controlling said first rotator so that in said one state it provides essentially 45° of rotation to the polarization of the radiation propagating in one direction in said loop, thereby enabling said radiation to propagate into said second segment and back to said gain medium, and so that in said other state it attenuates said radiation sufficiently to prevent lasing.

5. The invention of claim 4 wherein said second reflector comprises a partially transmissive grating from which the output of said laser emerges, and further including a second polarization rotator disposed between said gain medium and said second reflector for providing essentially 45° of polarization rotation to radiation propagating therethrough.

6. The invention of claim 1 wherein said laser further includes a multi-port polarization splitter combiner (PSC) having two ports coupled to said loop and one port coupled to said gain medium.

7. The invention of claim 6 wherein said isolator includes input and output segments of polarization-maintaining waveguide, said PSC includes a fourth port coupled to the output of said laser, and said switchable device launches radiation into said loop so that its polarization is oriented at an angle to a principal axis of said output segment that enables radiation coupled to said PSC to be split between said gain medium and said laser output.

8. A Fabry-Perot pulsed laser comprising first and second reflectors forming a resonator, a gain medium disposed within resonator, a source of pumping energy coupled to said gain medium to generate lasing radiation, said first reflector comprising a waveguide loop, a polarization splitter-combiner (PSC) for coupling said loop to said gain medium, said PSC being a multi-port device having two ports coupled to said loop and one port coupled to said gain medium, said second reflector comprising a partially transmissive grating from which the output of said laser emerges, an essentially 45° polarization rotator disposed between said gain medium and said second reflector, a switchable isolator disposed in said loop, said isolator having a first state which permits radiation to propagate in one direction in said loop and a second state which inhibits radiation from propagating in said loop, and a controller for switching said isolator between said states.

9. A Fabry-Perot pulsed laser comprising first and second reflectors forming a resonator, a gain medium disposed within resonator, a source of pumping energy coupled to said gain medium to generate lasing radiation, said first reflector comprising a waveguide loop, said second reflector comprising essentially a fully reflective grating, and a polarization splitter-combiner (PSC) for coupling said loop to said gain medium, said PSC being a multi-port device having two ports coupled to said loop, one port coupled to said gain medium, and one port coupled to the output of said laser, an essentially 45° polarization rotator disposed between said gain medium and said second reflector, a switchable isolator disposed in said loop, said isolator having a first state which permits radiation to propagate in one direction in said loop and a second state which inhibits radiation from propagating in said loop, and a controller for switching said isolator between said states.

* * * * *